US 8,244,796 B1
Aug. 14, 2012

(12) United States Patent
James et al.

(10) Patent No.: US 8,244,796 B1
(45) Date of Patent: Aug. 14, 2012

(54) METHOD AND APPARATUS FOR CUSTOMIZING PRESENTATION OF NOTIFICATION LISTS

(75) Inventors: Barnaby James, San Jose, CA (US); Scott E. Petersen, Morgan Hill, CA (US)

(73) Assignee: Adobe Systems Incorporated, San Jose, CA (US)

( * ) Notice: Subject to any disclaimer, the term of this patent is extended or adjusted under 35 U.S.C. 154(b) by 964 days.

(21) Appl. No.: 11/141,733

(22) Filed: May 31, 2005

(51) Int. Cl.
*G06F 15/16* (2006.01)
(52) U.S. Cl. ......... 709/203; 709/206; 715/762; 715/764
(58) Field of Classification Search .................. 715/762, 715/764, 234, 243; 709/203, 206, 217, 219
See application file for complete search history.

(56) References Cited

U.S. PATENT DOCUMENTS

| | | | | |
|---|---|---|---|---|
| 5,367,621 A * | 11/1994 | Cohen et al. | .................. | 715/209 |
| 5,787,246 A * | 7/1998 | Lichtman et al. | ............. | 709/220 |
| 5,905,492 A * | 5/1999 | Straub et al. | .................. | 715/744 |
| 6,148,330 A * | 11/2000 | Puri et al. | ...................... | 709/217 |
| 6,760,916 B2 | 7/2004 | Holtz et al. | | |
| 6,766,298 B1 * | 7/2004 | Dodrill et al. | ............. | 704/270.1 |
| 6,791,581 B2 * | 9/2004 | Novak et al. | .................. | 715/744 |
| 7,325,192 B1 * | 1/2008 | Bialek et al. | .................. | 715/255 |
| 7,363,353 B2 * | 4/2008 | Ganesan et al. | ............. | 709/218 |
| 7,559,034 B1 * | 7/2009 | Paperny et al. | ............... | 715/803 |
| 2002/0069218 A1 | 6/2002 | Sull et al. | | |
| 2002/0140729 A1 * | 10/2002 | Price et al. | .................... | 345/749 |
| 2003/0001880 A1 | 1/2003 | Holtz et al. | | |
| 2003/0093810 A1 | 5/2003 | Taniguchi | | |
| 2003/0126233 A1 * | 7/2003 | Bryers et al. | .................. | 709/219 |
| 2003/0195951 A1 * | 10/2003 | Wittel et al. | .................. | 709/220 |
| 2003/0225829 A1 * | 12/2003 | Pena et al. | ...................... | 709/203 |
| 2004/0039732 A1 * | 2/2004 | Huang | ............... | 707/3 |
| 2004/0210825 A1 | 10/2004 | Novak et al. | | |
| 2004/0225749 A1 * | 11/2004 | Pavlik et al. | .................. | 709/245 |
| 2005/0188078 A1 * | 8/2005 | Kotzin et al. | .................. | 709/224 |
| 2005/0193010 A1 * | 9/2005 | DeShan et al. | ............. | 707/104.1 |
| 2005/0198650 A1 * | 9/2005 | Ford et al. | ...................... | 719/321 |
| 2005/0246837 A1 * | 11/2005 | Macari et al. | ...................... | 5/426 |
| 2005/0289147 A1 * | 12/2005 | Kahn et al. | ...................... | 707/10 |
| 2006/0129917 A1 * | 6/2006 | Volk et al. | ...................... | 715/513 |

(Continued)

OTHER PUBLICATIONS

Winer, D., "RSS 2.0 Specification," http://blogs.law.havard.edu/tech/rss, Jan. 30, 2005, pp. 1-10.*

(Continued)

*Primary Examiner* — Abdullahi Salad
*Assistant Examiner* — Jimmy H Tran
(74) *Attorney, Agent, or Firm* — Robert C. Kowert; Meyertons, Hood, Kivlin, Kowert & Goetzel, P.C.

(57) ABSTRACT

Embodiments for customizing the presentation of a notification list are disclosed. In one example implementation, a method is provided for assembling a notification list including a plurality of tags to specify at least in part how the notification list is to be displayed by a client, and then causing the notification list to be transmitted to the client. In one example implementation, a method is provided including receiving, by a client, a notification list, where the notification list includes a plurality of tags to specify at least in part how the notification list is to be displayed, and causing the notification list to be displayed by the client in a manner specified at least in part by the plurality of tags.

45 Claims, 6 Drawing Sheets

U.S. PATENT DOCUMENTS

| | | | |
|---|---|---|---|
| 2006/0167860 A1* | 7/2006 | Eliashberg et al. | 707/3 |
| 2006/0173985 A1* | 8/2006 | Moore | 709/223 |
| 2006/0230021 A1* | 10/2006 | Diab et al. | 707/3 |
| 2006/0259462 A1* | 11/2006 | Timmons | 707/3 |
| 2008/0040151 A1* | 2/2008 | Moore | 705/2 |
| 2008/0133510 A1* | 6/2008 | Timmons | 707/5 |

OTHER PUBLICATIONS

Hammersley, B., "Content Syndication with RSS," Mar. 1, 2003 O'Reilly & Associates, Inc., Ch 4, 11.*

* cited by examiner

METHOD AND APPARATUS FOR CUSTOMIZING PRESENTATION OF NOTIFICATION LISTS

FIELD

This application pertains to the field of digital information dissemination, and more particularly, to the field of publishing and/or displaying notification lists.

BACKGROUND

Notification lists are becoming an increasingly popular way for information providers on the Internet to publicize the availability of information. A notification list may be generated at a server, and the list may include items where each item may include some descriptive text such as a title and a Uniform Resource Locator (URL) link to a resource such as a document on the World Wide Web (Web).

Software agents commonly known as aggregators may be executed on client or server computer systems or other electronic devices. Aggregators may periodically poll one or more information provider servers to determine the availability of one or more notification lists and may retrieve the lists from the polled servers. Aggregators cause the items contained in the notification lists to be displayed to a user. Typically, an aggregator will display the notification lists in one or more panes. In one pane, the aggregator may display the names of the notification lists, and in another pane the aggregator may display titles of the items included in the notification lists. Some aggregators may also include another pane to display Web pages that are retrieved in response to a selection by a user of a title of an item from one of the notification lists. Other aggregators may display notification list information in other ways.

One popular example of notification lists are RSS feeds. RSS may be referred to by several names, including Really Simple Syndication, Rich Site Summary, or RDF (Resource Description Framework) Site Summary. RSS feeds may include information that is formatted in accordance with the Extensible Markup Language (XML) standard.

BRIEF DESCRIPTION OF THE DRAWINGS

The claimed subject matter will be understood more fully from the detailed description given below and/or from the accompanying drawings of embodiments which should not be taken to limit claimed subject matter to the specific embodiments described, but are for explanation and understanding only.

DETAILED DESCRIPTION

Figure 1:
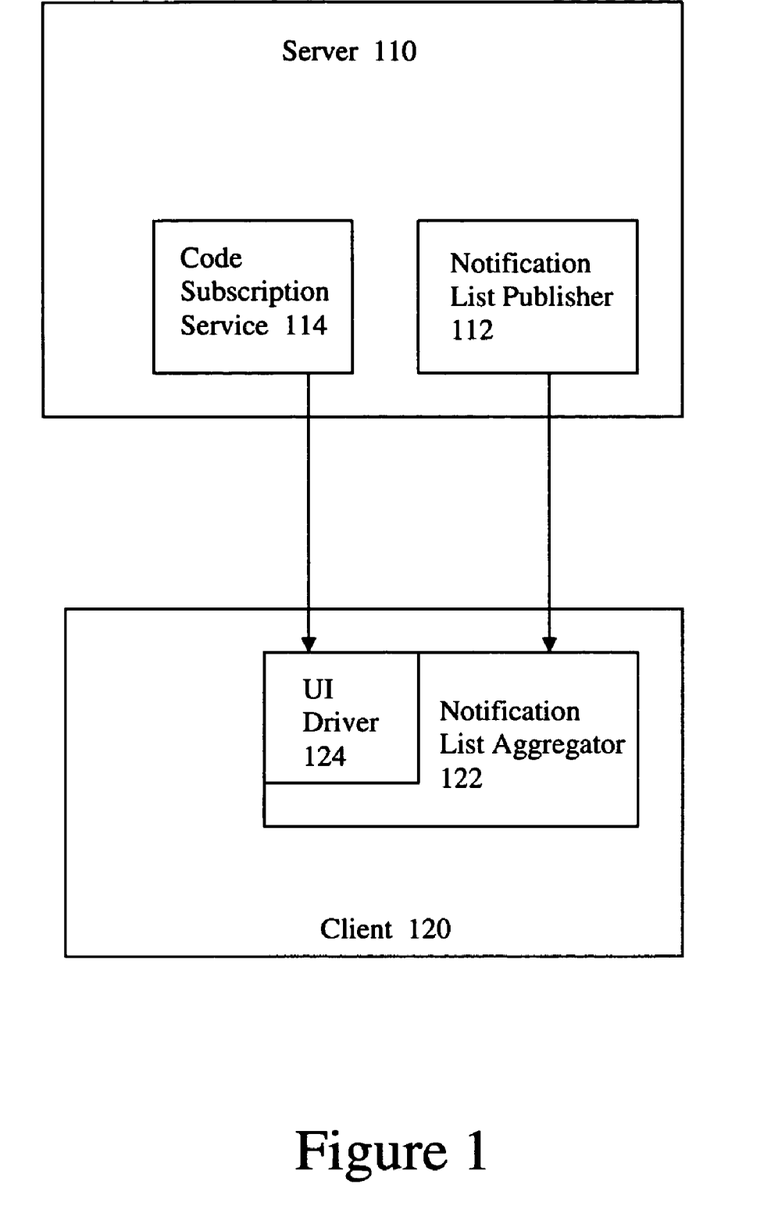
FIG. 1 is a block diagram of an example system including a server including a notification list publisher and a client including an example embodiment of a notification list aggregator.

FIG. 1 is a block diagram of an example system including a server 110 that includes a notification list publisher 112 and a code subscription service 114. The system of FIG. 1 also includes a client 120 including an example embodiment of a notification list aggregator 122. A user interface (UI) driver 124 is associated with the notification list aggregator 122. The server 110 and/or client 120 may include one or more processors that may execute instructions that may comprise software agents including, but not limited to, code subscription services, notification list publishers, notification list aggregators, and/or user interface drivers. The software agents may be stored on machine-readable media including, but not limited to, hard disk drives, CD ROM discs, DVD discs, etc.

Notification list publisher 112 may assemble a notification list including one or more items. For this example, the notification list may comprise an RSS feed. Other embodiments are possible using other types of notification lists and/or syndication formats. Each item in the notification list may include a title, a description, and/or a URL link. The notification list may also include tags to indicate to aggregator 122 at least in part how to display the notification list.

As used herein, the term "tag" is meant to include any information within a notification list that provides information regarding how to customize the appearance and/or behavior of the information in a notification list and may also include information regarding customization of the appearance and/or behavior of a notification list aggregator. For example, tags may be used to customize how the items in the notification list are to be grouped when displayed by an aggregator. Tags may also specify which icon is to be associated with the notification list or an item within the list. Grouping and icons are merely examples of how tags may be used to customize the appearance and/or behavior of the information included in the notification list, and tags may be used to customize other aspects of appearance and/or behavior.

By including tags in the notification list, notification list publisher 112 can specify to the aggregator 122 how to customize the appearance and/or behavior of the notification list.

A tag may be included in a notification list that specifies to the aggregator 122 which UI driver to use to cause the items of the notification list to be displayed. This allows the publisher 112 additional control regarding the display and behavior of notification list items. Tags may also be used to indicate various functions be performed by the UI driver 124, such as, for example, the creation of custom toolbars and/or menus. The UI driver may be updated periodically from the code subscription service 114. For this example embodiment, the code subscription service and the notification list publisher reside on the same server.

Tags may be associated with a notification list as a whole, with individual items within the list, or with both the list as a whole and individual items within the list. One example of a tag that may be used at the list level is the grouping tag, although the grouping tag is not limited to being used at the list level. An example of a tag that may be used at the item level is the icon tag, although the icon tag is not limited to being used at the item level. The UI driver tag is an example of a tag that may be used at both the list level and/or at the item level. In this manner, each item of a list can specify a UI driver.

For the example embodiments described herein, the notification list publisher is an RSS feed publisher, and the notification list aggregator is an RSS aggregator. RSS feeds retrieved from publisher 112 may be XML files for this example. The UI driver 124 for this example may comprise a JavaScript file, although other embodiments are possible using other UI driver formats.

An RSS feed for this example may include a plurality of items. Each item may include a title, description, and/or URL link. Other information may be included, such as author and/or modification date.

For the example embodiments described herein, the tags used to customize the appearance and/or behavior of RSS items are implemented as XML elements defined in a namespace. An RSS feed may specify a namespace. For example, if a namespace is located at "http://www.example.org/RSS/Inbox", the namespace prefix can be set by including the line "xmlns:inbox="http://www.example.org/RSS/Inbox"" within the RSS feed XML file. This indicates to aggregator 122 which namespace is being specified and sets the namespace prefix to "inbox." Of course, these are merely examples and the namespace URL is fictitious.

One example namespace element may specify a user interface software agent (driver) to be used at least in part to display the items of the RSS feed and/or to customize the appearance and/or behavior of the aggregator 122. For this example, the element may be formatted "<inbox:feedUI/>." For this example, UI driver 124 may comprise a JavaScript file with a URL of "myCustomUI.js." The code in the RSS feed XML document to specify the "myCustomUI" driver may be formatted "<inbox:feedUI>myCustomUI.js</inbox:feedUI>."

Another example namespace element may specify how to group items within the RSS feed. For this example, the element may be formatted "<inbox:groupBy/>." For this example, the "groupBy' tag may be used to group the feed items according to author. The code in the RSS feed XML file for this example may be formatted "<inbox:groupBy>author</inbox:groupBy>."

A further example namespace element may specify how to sort items within the RSS feed. For this example, the element may be formatted "<inbox:sortBy/>." For this example, the "sortBy' tag may be used to sort the feed items according to author. The code in the RSS feed XML file for this example may be formatted "<inbox:sortBy>author</inbox:sortBy>."

A additional example namespace element may specify a URL of an icon to be associated with the RSS feed. For this example, the element may be formatted "<inboxicon/>." For this example, the icon URL is Circle.png. The code in the RSS feed XML for this example may be formatted "<inbox:icon>Circle.png</inbox:icon>."

Although the embodiments described herein include tags for grouping, sorting, assigning icons, and specifying UI drivers, other embodiments are possible that include tags for other aspects of customizing the appearance and/or behavior of feed items. Further, although the embodiments described herein include tags specifying UI driver functions for creating custom toolbars and/or menus, other embodiments may include tags specifying other UI driver functions.

Client 120 may comprise any of a wide range of types of electronic devices, including, but not limited to, notebook computers, desktop computers, cellular phones, personal digital assistants, gaming devices, etc.

Figure 2:
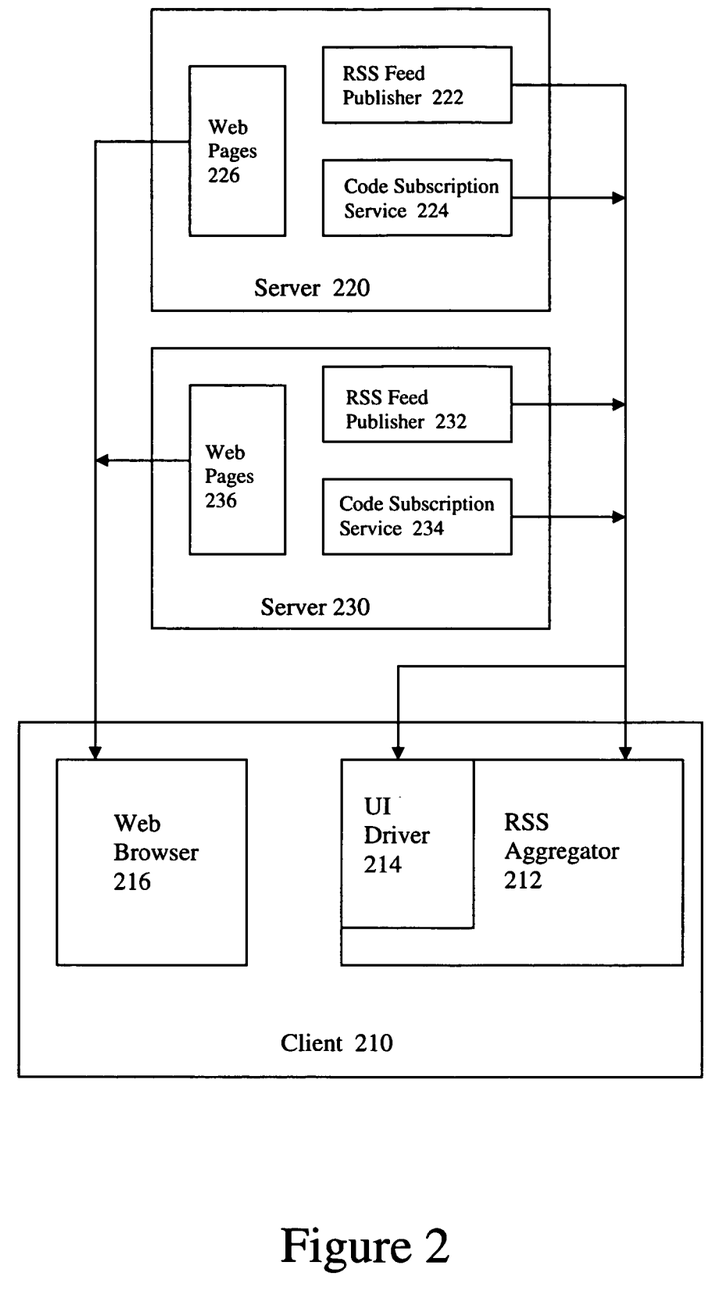
FIG. 2 is a block diagram of an example system including a client and two servers each including an RSS feed publisher and a code subscription service.

FIG. 2 is a block diagram of an example system including a client 210 and a server 220 and a server 230. Client 210 includes an RSS aggregator 212 and a UI driver 214 associated with RSS aggregator 212. Client 216 further includes a web browser 216. Server 220 includes an RSS feed publisher 222 and a code subscription service 224. Server 220 further includes a number of web pages 226. Server 230 includes an RSS feed publisher 232 and a code subscription service 234. Server 230 further includes a number of web pages 236.

RSS aggregator 212 for this example may subscribe to both RSS feed 222 and RSS feed 232. RSS aggregator 212, in association with UI driver 214, may cause the RSS feed items to be displayed on a display device (not shown). One or more of the feed items from RSS feed 222 may include URL links to one or more of web pages 226. Similarly, one or more of the feed items from RSS feed 232 may include URL links to one or more of web pages 236. The web pages may be displayed by the web browser 216. For this example embodiment, web browser 216 is separate from aggregator 212, although other embodiments may include an aggregator that provides a pane for displaying web pages.

For this example embodiment, each of the code subscription services 224 and 234 may provide UI drivers to client 210. RSS aggregator 212 may use the UI driver provided by server 220 when displaying feed 222 and/or performing UI functions specified within feed 222. Similarly, RSS aggregator 212 may use the UI driver provided by server 230 when displaying feed 232 and/or performing UI functions specified within feed 232. If feeds 222 and 232 do not specify a UI driver, then a generic driver may be used. Also, if feed 222 specifies a UI driver function that cannot be performed using the driver supplied by code subscription service 224, then the generic driver will be used for that function. Similarly, if feed 232 specifies a UI driver function that cannot be performed using the driver supplied by code subscription service 234, then the generic driver will be used for that function.

Client 210 may comprise any of a wide range of types of electronic devices, including, but not limited to, notebook computers, desktop computers, cellular phones, personal digital assistants, gaming devices, etc.

Figure 3:
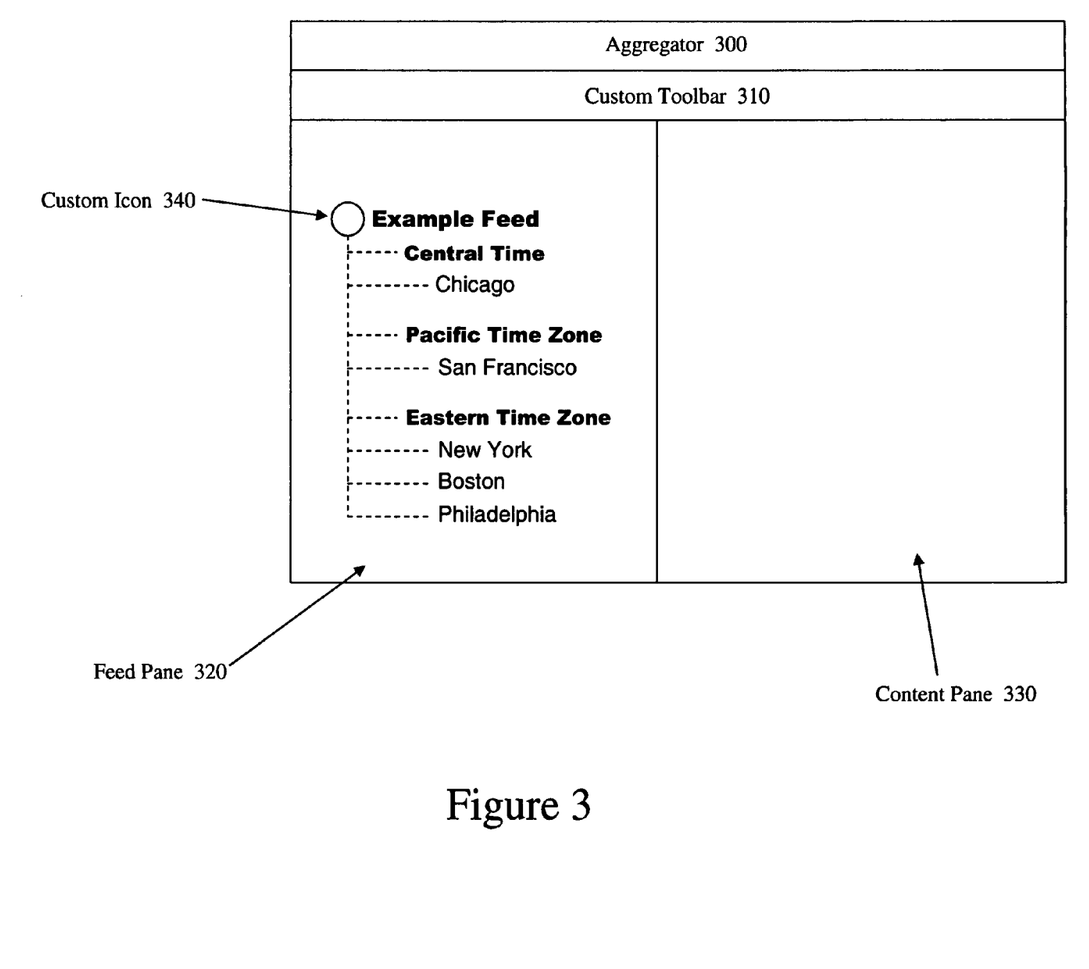
FIG. 3 is a diagram depicting an example display generated by an example embodiment of an aggregator.

FIG. 3 is a diagram depicting an example display generated by an example embodiment of an aggregator. For this example embodiment, aggregator display 300 may include a feed pane 320 for displaying RSS feeds and feed items. Aggregator display 300 also includes a content pane for displaying content associated with the RSS feed or feed items. For example, if a user selects the item labeled "Chicago", a title of the item and perhaps a description of the item may be displayed in the content pane. A selection of an item may also cause a web browser to open in order to display a web document pointed to by a URL link. Other embodiments of aggregator displays may include a pane for displaying web documents.

For this example, items from a feed labeled "Example Feed" are displayed in feed pane 320. "Example Feed" includes items labeled "Chicago", "San Francisco", "New York", "Boston", and "Philadelphia". As can be seen, the items have been grouped according to time zone. This may be accomplished by using the "groupBy" tag discussed above and by specifying a "time zone" element within the XML file for "Example Feed".

Aggregator display 300 also includes a custom toolbar 310 which may be specified in a manner described above in connection with UI driver functions.

The display of FIG. 3 is merely an example showing the grouping of items and the creation of a custom toolbar, where the grouping and the custom toolbar are specified within an RSS feed XML file.

Figure 4:
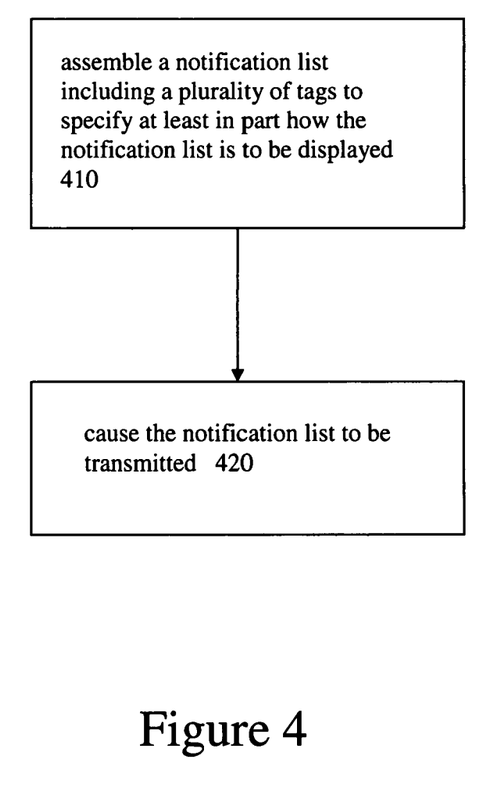
FIG. 4 is a flow diagram of an example embodiment of a method for publishing a notification list that includes tags to specify at least in part how the notification list is to be displayed.

FIG. 4 is a flow diagram of an example embodiment of a method for publishing a notification list that includes tags to specify at least in part how the notification list is to be displayed. At block 410, a notification list is assembled. The notification list includes a plurality of tags to specify at least in part how the notification list is to be displayed. The notification list is caused to be transmitted at block 420. The techniques for specifying how the notification list is to be displayed may be similar to those discussed above in connection with FIGS. 1-3. The notification list for this example may comprise an RSS feed XML file. The tags may comprise XML namespace elements, and may specify customization techniques including, but not limited to, grouping of elements, sorting of elements, specification of UI drivers, UI driver functions for creating toolbars, UI driver functions for creating menus, etc.

Figure 5:
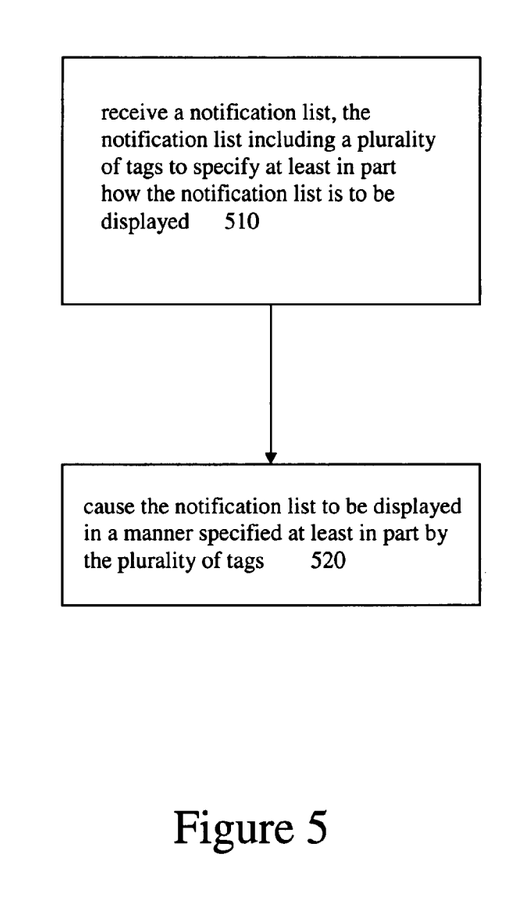
FIG. 5 is a flow diagram of an example embodiment of a method for customizing the display of a notification list.

FIG. 5 is a flow diagram of an example embodiment of a method for customizing the display of a notification list. At block 510, a notification list is received. The notification list may include a plurality of tags to specify at least in part how the notification list is to be displayed. At block 520, the notification list is caused to be displayed in a manner at least in part specified by the plurality of tags. The techniques for specifying how the notification list is to be displayed may be similar to those discussed above in connection with FIGS. 1-3. The tags may comprise XML namespace elements, and may specify customization techniques including, but not limited to, grouping of elements, sorting of elements, specification of UI drivers, UI driver functions for creating toolbars, UI driver functions for creating menus, etc.

Figure 6:
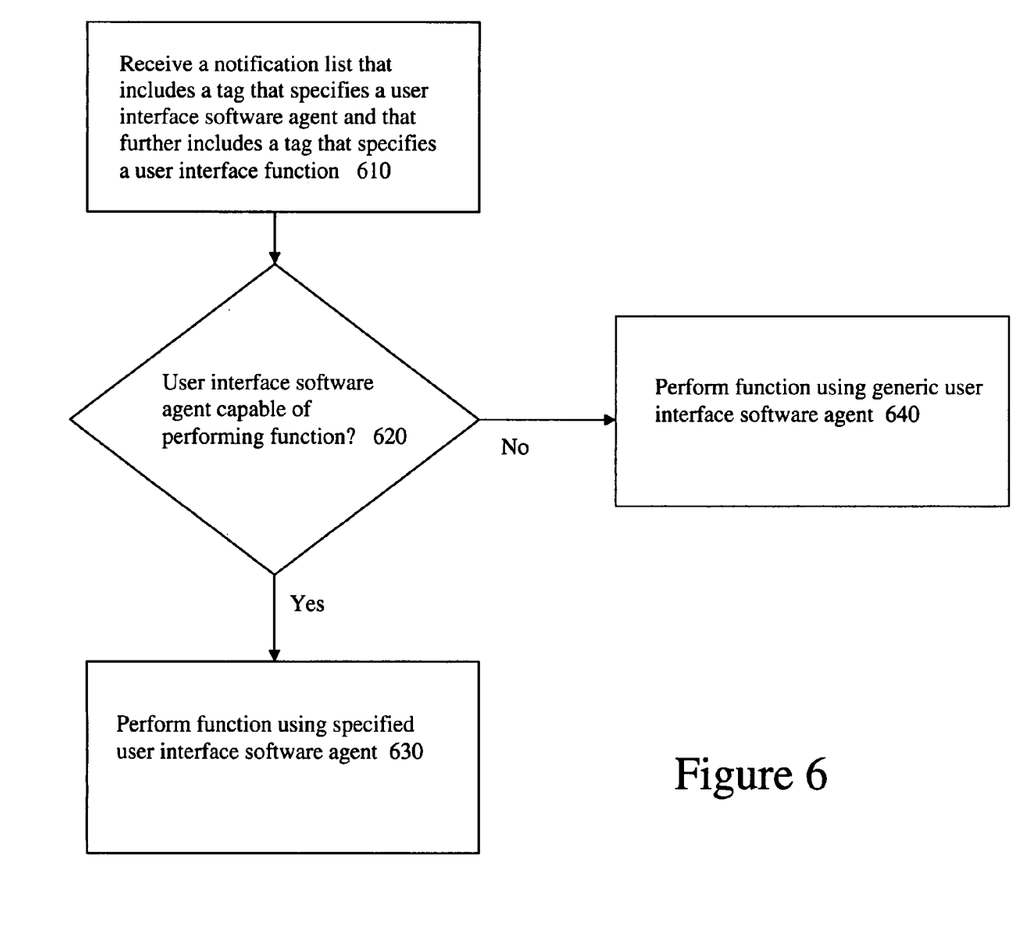
FIG. 6 is a flow diagram of an example embodiment for customizing the display of a notification list using a user interface software agent specified by a tag included in the notification list.

FIG. 6 is a flow diagram of an example embodiment for customizing the display of a notification list using a user interface software agent specified by a tag included in the notification list. The software agent may comprise a UI driver and may further comprise a JavaScript file. At block 610, a notification list is received. The notification list includes a tag that specifies a user interface software agent. The notification list further includes a tag that specifies a user interface software function. Block 620 indicates that if the specified user interface software agent is capable of performing the specified function, the function is performed using the specified user interface software agent at block 630. If the specified user interface software agent is not capable of performing the function, at block 640 the function is performed using a generic user interface software agent.

The notification list for this example may comprise an RSS feed XML file, and the tag may comprise an XML namespace element. The techniques for specifying a user interface and functions may be similar to those discussed above in connection with FIGS. 1-3.

Although the example embodiments discussed herein describe notification list aggregators residing on clients, other embodiments are possible where notification list aggregators reside on servers.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

In the foregoing specification claimed subject matter has been described with reference to specific example embodiments thereof. It will, however, be evident that various modifications and/or changes may be made thereto without departing from the broader spirit and/or scope of the subject matter as set forth in the appended claims. The specification and/or drawings are, accordingly, to be regarded in an illustrative rather than in a restrictive sense.

What is claimed is:

1. A method, comprising:
   executing instructions on an electronic device to:
   assemble, at an RSS publisher, a notification list including a plurality of tags to specify at least in part how the notification list is to be displayed by an RSS notification list aggregator residing on a client, wherein the plurality of tags includes at least different types of tags including:
   a tag to directly specify how at least an associated portion of the notification list is to be displayed as a grouping of elements, a sorting of elements, or as an association with an icon; and
   another tag to directly specify a user interface driver file to utilize to perform one or more functions for displaying the notification list,
   wherein the user interface driver file comprises executable instructions to cause performing of one or more functions for enabling the notification list to be displayed, and wherein the specified user interface driver file is provided to the client separate from the notification list provided by the RSS publisher; and
   initiate transmission of the notification list to the client.

2. The method of claim 1, further comprising executing the instructions on the electronic device to assemble a notification list including a plurality of items, wherein one or more of the plurality of tags specifies how to group one or more of the plurality of items if displayed by the client.

3. The method of claim 1, further comprising executing the instructions on the electronic device to assemble a notification list including a plurality of items, wherein one or more of the plurality of tags specifies an icon to be displayed by the client in association with one or more of the plurality of items.

4. The method of claim 1, wherein the specified user interface driver comprises a JavaScript file.

5. The method of claim 1, further comprising executing the instructions on the electronic device to transmit an RSS feed.

6. The method of claim 5, further comprising executing the instructions on the electronic device to implement the plurality of tags as extensions to an RSS standard using XML namespace elements.

7. A method, comprising:
   executing instructions on an electronic device to:
   receive a notification list from an RSS publisher, the notification list including a plurality of tags to specify at least in part how the notification list is to be displayed by an RSS notification list aggregator residing on a client, wherein the plurality of tags includes at least different types of tags including:
   a tag to directly specify how at least an associated portion of the notification list is to be displayed as a grouping of elements, a sorting of elements, or as an association with an icon; and
   another tag to directly specify a user interface driver file to utilize to perform one or more functions for displaying the notification list,
   wherein the user interface driver file comprises executable instructions to cause performing of one or more functions for enabling the notification list to be displayed, and wherein the specified user interface driver file is provided to the client separate from the notification list provided by the RSS publisher; and
   initiate display the notification list, by the client, in a manner specified at least in part by the plurality of tags.

8. The method of claim 7, further comprising executing the instructions on the electronic device to receive a notification list including a plurality of items, and further comprising executing the instructions on the electronic device to group one or more of the plurality of items in a manner specified by one or more of the plurality of tags.

9. The method of claim 7, further comprising executing the instructions on the electronic device to receive a notification list including a plurality of items, and further comprising executing the instructions on the electronic device to associate an icon with one or more of the items in a manner specified by one or more of the plurality of tags.

10. The method of claim 7, wherein the specified user interface driver comprises a JavaScript file.

11. The method of claim 7, further comprising executing the instructions on the electronic device to receive an RSS feed.

12. The method of claim 11, further comprising executing the instructions on the electronic device to implement the tags as extensions to an RSS standard using XML namespace elements.

13. A non-transitory computer-readable storage medium containing instructions that in response to being executed by a processor, at least in part direct the processor to:
assemble, at an RSS publisher, a notification list including a plurality of tags to specify at least in part how the notification list is to be displayed by an RSS notification list aggregator residing on a client, wherein the plurality of tags includes at least different types of tags including:
a tag to directly specify how at least an associated portion of the notification list is to be displayed as a grouping of elements, a sorting of elements, or as an association with an icon; and
another tag to directly specify a user interface driver file to utilize to perform one or more functions for displaying the notification list,
wherein the user interface driver file comprises executable instructions to cause performing of one or more functions for enabling the notification list to be displayed, and wherein the specified user interface driver file is provided to the client separate from the notification list provided by the RSS publisher; and
initiate transmission of the notification list to the client.

14. The non-transitory computer-readable storage medium of claim 13, wherein the instructions, in response to being executed by the processor, at least in part direct the processor to assemble the notification list by assembling a notification list including a plurality of items, and wherein one or more of the plurality of tags specifies how to group one or more of the plurality of items when displayed.

15. The non-transitory computer-readable storage medium of claim 13, wherein the instructions, in response to being executed by the processor, at least in part direct the processor to assemble the notification list by assembling a notification list including a plurality of items, and wherein one or more of the plurality of tags specifies an icon to be displayed in association with one or more of the plurality of items.

16. The non-transitory computer-readable storage medium of claim 13, wherein the specified user interface driver comprises a JavaScript file.

17. The non-transitory computer-readable storage medium of claim 13, wherein the instructions, in response to being executed by the processor, at least in part direct the processor to transmit a notification list by transmitting an RSS feed.

18. The non-transitory computer-readable storage medium of claim 17, wherein the plurality of tags are implemented as extensions to an RSS standard using XML namespace elements.

19. A non-transitory computer-readable storage medium containing instructions that in response to being executed by a processor, at least in part direct the processor to:
receive a notification list from an RSS publisher, the notification list including a plurality of tags to specify at least in part how the notification list is to be displayed by an RSS notification list aggregator residing on a client, wherein the plurality of tags includes at least different types of tags including:
a tag to directly specify how at least an associated portion of the notification list is to be displayed as a grouping of elements, a sorting of elements, or as an association with an icon; and
another tag to directly specify a user interface driver file to utilize to perform one or more functions for displaying the notification list,
wherein the user interface driver file comprises executable instructions to cause performing of one or more functions for enabling the notification list to be displayed, and wherein the specified user interface driver file is provided to the client separate from the notification list provided by the RSS publisher; and
initiate display of the notification list by the client.

20. The non-transitory computer-readable storage medium of claim 19, wherein the instructions, in response to being executed by the processor, at least in part direct the processor to receive the notification list by receiving a notification list including a plurality of items, and wherein the instructions, if in response to being executed by the processor, at least in part direct the processor to group one or more of the plurality of items in a manner specified by one or more of the plurality of tags.

21. The non-transitory computer-readable storage medium of claim 19, wherein the instructions, in response to being executed by the processor, at least in part direct the processor to receive the notification list by receiving a notification list including a plurality of items, and wherein the instructions, in response to being executed by the processor, at least in part direct the processor to associate an icon with one or more of the items in a manner specified by one or more of the plurality of tags.

22. The non-transitory computer-readable storage medium of claim 19, wherein the specified user interface driver comprises a JavaScript file.

23. The non-transitory computer-readable storage medium of claim 19, wherein the instructions, in response to being executed by the processor, at least in part direct the processor to receive a notification list by receiving an RSS feed.

24. The non-transitory computer-readable storage medium of claim 23, wherein the tags are implemented as extensions to an RSS standard using XML namespace elements.

25. A method, comprising:
executing instructions on an electronic device to:
receive, by a client and from a user interface driver provider, a user interface driver file, wherein the user interface driver file comprises executable instructions for performing one or more functions for displaying at least a portion of a notification list by an RSS notification list aggregator;
receive, by a client and from an RSS publisher, a notification list comprising:
a plurality of items; and at least different types of tags including:
  a tag that directly specifies how at least an associated portion of the notification list is to be displayed as a grouping of at least some items of the plurality of items, a sorting of the at least some items, or as an association with an icon, and
  a tag that directly specifies a user interface driver file for performing one or more functions for displaying at least a portion of a notification list by an RSS notification list aggregator,
  wherein at least a portion of the user interface driver file is provided to the client separate from the notification list provided by the RSS publisher, and wherein the RSS notification list aggregator resides on the client; and
  initiate display of the plurality of items by using at least in part the specified user interface driver and the tag that directly specifies how at least the associated portion of the notification list is to be displayed.

26. The method of claim 25, wherein the one or more functions are performed using the specified user interface driver if the one or more functions can be performed at the client using the specified user interface driver, and wherein the one or more functions are performed using another user interface driver associated with the client if the one or more functions can not be performed at the client using the specified user interface driver.

27. The method of claim 26, further comprising executing the instructions on the electronic device to perform the user interface function using the specified user interface driver.

28. The method of claim 26, further comprising executing the instructions on the electronic device to perform the user interface function using a generic user interface software agent to perform the user interface function if the specified user interface driver is not capable of performing the function.

29. A non-transitory computer-readable storage medium containing instructions that in response to being executed by a processor, at least in part direct the processor to:
  receive, by a client and from a user interface driver provider, a user interface driver file, wherein the user interface driver file comprises executable instructions for performing one or more functions for displaying at least a portion of a notification list by an RSS notification list aggregator;
  receive, by a client and from an RSS publisher, a notification list comprising:
    a plurality of items; and
    at least different types of tags including:
      a tag that directly specifies how at least an associated portion of the notification list is to be displayed as a grouping of at least some items of the plurality of items, a sorting of the at least some items, or as an association with an icon, and
      a tag that directly specifies a user interface driver file for performing one or more functions for displaying at least a portion of a notification list by an RSS notification list aggregator,
    wherein at least a portion of the user interface driver file is provided to the client separate from the notification list provided by the RSS publisher, and wherein the RSS notification list aggregator resides on the client; and
  initiate display of the plurality of items at least in part by using the specified user interface driver and the tag that directly specifies how at least the associated portion of the notification list is to be displayed.

30. The non-transitory computer-readable storage medium of claim 29, wherein the one or more functions are performed using the specified user interface driver if the one or more functions can be performed at the client using the specified user interface driver, and wherein the one or more functions are performed using another user interface driver associated with the client if the one or more functions can not be performed at the client using the specified user interface driver.

31. The non-transitory computer-readable storage medium of claim 30, wherein the instructions, in response to being executed by the processor, at least in part direct the processor to perform the user interface function using the specified user interface driver.

32. The non-transitory computer-readable storage medium of claim 30, wherein the instructions, in response to being executed by the processor, at least in part direct the processor to perform the user interface function using a generic user interface software agent to perform the user interface function if the specified user interface driver is not capable of performing the function.

33. A method, comprising:
  executing instructions on an electronic device to:
    receive a notification list from an RSS publisher, the notification list comprising at least an RSS syndication feed, the notification list including a plurality of tags to specify, at least in part, an appearance of items of the notification list on a display of an RSS notification list aggregator residing on a client, wherein the plurality of tags includes at least different types of tags including:
      a tag to directly specify how at least an associated portion of the notification list is to be displayed as a grouping of elements, a sorting of elements, or as an association with an icon; and
      another tag to directly specify a user interface driver file to utilize to perform one or more functions for enabling the notification list to be displayed,
    wherein the user interface driver file comprises executable instructions to cause performing of one or more functions for enabling the notification list to be displayed, and wherein the specified user interface driver file is provided to the client separate from the notification list provided by the RSS publisher; and
    initiate display of the notification list by the client using the specified user interface driver in a manner specified at least in part by the plurality of tags.

34. The method of claim 33, wherein at least one of the items comprises at least one of a title, a description, or a URL link.

35. The method of claim 33, wherein the appearance of items comprises a customized grouping of the items if displayed by the client.

36. The method of claim 33, wherein the appearance of items comprises at least one icon associated with at least one of the items of the notification list if displayed by the client.

37. The method of claim 33, wherein the one or more functions are performed using the specified user interface driver if the one or more functions can be performed at the client using the specified user interface driver, and wherein the one or more functions are performed using another user interface driver associated with the client if the one or more functions can not be performed at the client using the specified user interface driver.

38. The method of claim 1, wherein the one or more functions are performed using the specified user interface driver if the one or more functions can be performed at the client using the specified user interface driver, and wherein the one or more functions are performed using another user interface driver associated with the client if the one or more functions can not be performed at the client using the specified user interface driver.

39. The method of claim 7, wherein the one or more functions are performed using the specified user interface driver if the one or more functions can be performed at the client using the specified user interface driver, and wherein the one or more functions are performed using another user interface driver associated with the client if the one or more functions can not be performed at the client using the specified user interface driver.

40. The non-transitory computer-readable storage medium of claim 13, wherein the one or more functions are performed using the specified user interface driver if the one or more functions can be performed at the client using the specified user interface driver, and wherein the one or more functions are performed using another user interface driver associated with the client if the one or more functions can not be performed at the client using the specified user interface driver.

41. The non-transitory computer-readable storage medium of claim 19, wherein the one or more functions are performed using the specified user interface driver if the one or more functions can be performed at the client using the specified user interface driver, and wherein the one or more functions are performed using another user interface driver associated with the client if the one or more functions can not be performed at the client using the specified user interface driver.

42. The method of claim 1, wherein the user interface driver is updated periodically.

43. The method of claim 7, receiving an updated user interface driver file periodically.

44. The method of claim 16, wherein the user interface driver file is received by the client from a code subscription service residing on the same server as the RSS publisher.

45. The method of claim 44, further comprising receiving an updated user interface driver file from the code subscription service.

\* \* \* \* \*